UNITED STATES PATENT OFFICE 2,225,149

PORTLAND CEMENT

Ira C. Bechtold and Harry E. Kaiser, Colton, Calif., assignors to California Portland Cement Company, Los Angeles, Calif., a corporation of California No Drawing. Application April 2, 1938, Serial No. 199,685

5 Claims. (Cl. 106—27)

This invention relates generally to Portland cements, and has for its primary object to provide for the manufacture of Portland cements having certain improved properties, particularly with respect to plasticity and workability.

We have discovered that the plastic properties of Portland cements may be greatly improved by intergrinding the cement clinker with a small percentage of a gasoline insoluble wood resin, commercially known under the trade name "Vinsol". This gasoline insoluble resin which we use, and refer to hereinafter simply as "the resin," may be produced by extracting resinous pine wood with a coal tar hydrocarbon, removing the hydrocarbon by evaporation, leaving a residue comprising a mixture of wood rosin and the gasoline insoluble resin. This resin then is separated from the wood rosin by extracting the latter by a suitable petroleum hydrocarbon in which the wood rosin is soluble.

The resin has been found to improve the plastic properties of Portland cements in general, and the invention therefore is not to be regarded as limited to Portland cements of any particular type or composition. For example, the plastic properties of a normal Portland cement manufactured by intergrinding the resin with Portland cement clinker containing the usual amount of gypsum, are markedly improved by the presence of the resin. Also, the resin has been found correspondingly effective for improving the properties of plastic Portland cements containing other materials adapted to increase the plasticity and workability of the finished cement. Although of secondary importance, another advantage in the use of the resin is its effectiveness as a grinding aid, i. e. an admixture that reduces the energy required to grind the clinker to a given fineness level. Like other grinding aids, the resin apparently acts as a dispersing agent, tending to free or disperse into the clinker being ground, fine particles that otherwise tend to build up in layers on the grinding media and wall of the mill and thereby prevent direct interaction between the grinding surfaces.

Referring particularly to plastic cements, the resin may be interground with Portland cement clinker containing other material adapted to give greater plasticity to the finished cement. We may use one, or a mixture, of two general types of such materials, the effect of which is to promote formation of particle size distribution and increased specific surface which enhance the plastic properties of the finished cement. One type of such materials may be classed as chemically inert substances, for example natural sand, and particularly sands relatively rich in free quartz such as result from weathering of granitic rocks. The second type are active materials in the sense that they are reactive with lime released in the cement during hydration. Pouzzolanic materials, for example certain shales of marine origin occurring as marine sediments of Miocene Age in the Upper Puente of Southern California, are illustrative. These shales are characterized by their pronounced pouzzolanic activity. The pouzzolan, like sand, has the effect of aiding in developing a product of particle size distribution and specific surface especially desirable for plastic cement, and it has the additional property, by reason of its capacity for reaction with lime released from the cement during hydration, of increasing the strength obtained in mortars at late ages.

The improved properties of a normal Portland cement interground with the resin in different proportions, are illustrated in Table I below. The control sample A consisted of 1816 grams of Portland cement clinker mixed with 69 grams of gypsum and subjected to two-stage grinding in a ball mill, the first stage consisting of 900 revolutions of the mill charged with 45 lbs. of 1¼" balls, and the second stage 1820 revolutions of the mill recharged with 70 lbs. of ⅜ to ½" balls. Samples B, C and D were cements prepared from the same stock as the control sample and differing in composition only in being interground with small amounts of the resin in the proportions indicated in the table. All samples were subjected to grinding under exactly the same conditions so that their differences in fineness are due solely to the presence of the resin. Samples B, C and D are shown to have substantially larger proportions of particle sizes within the 0 to 20 micron range, and greater specific surfaces than the control sample. Net expansions in the standard autoclave test are but slightly higher for the samples interground with the resin, and for all practical purposes are as satisfactory as the control sample in this respect. Setting times and tensile strengths are satisfactory, although it is indicated that where, as in sample D, the resin content is increased to as high as 0.50%, the final setting time may be delayed and the initial tensile strength materially reduced. It is to be noted, however, that with such proportions of the resin present, the strength developed at periods such as seven days or longer is as high as the strength developed in cements of lower resin content. Although the setting times are somewhat longer for cements B, C and D, this is desirable for most work in which plastic cements are used. The outstanding improved properties of cements B, C and D, however, are their superior plasticity and workability. Each of these cements when mixed with water in the percentages indicated for neat cement, displays exceptional plasticity and smoothness in working. When mixed with water in sand mortars such as are used in plaster or stucco construction these cements exhibit unusual workability and highly desirable plastic properties.

For purposes of comparison, the table shows corresponding properties of an ordinary commercial plastic Portland cement, which is generally regarded as having good workability and plastic properties. Cements B, C and D are found to be superior to cement E in plastic properties, as demonstrated by workability tests, and to have these superior properties notwithstanding the fact that their finenesses are considerably below the fineness of cement E. This fact is of course significant in that the cements contemplated by the invention may be manufactured at considerable savings in grinding costs, and still surpass in plastic properties, the more finely ground plastic cements of ordinary compositions. Note also that in the tabulated comparison of the plaster mortar tensile strengths of samples B and E, the former shows substantially the same strengths as the commercial plastic cement at one day and three days, and a tendency to excel in strength at seven days.

Table II shows a comparison of properties between the same control sample given in Table I, and cements F to J prepared by intergrinding samples of the control stock with the resin and sand (samples F and G) and resin with pouzzolanic shale (samples H, I and J), in the percentages indicated. All samples were subjected to the same grinding time and procedure as has been set forth for the cements of Table I.

It will be noted that with the normal amount of grinding given cements in the series shown in Table II, cements F, G, H, I and J show relatively high finenesses as compared with the control sample. These cements have the advantage of requiring relatively small amounts of grinding energy to produce reasonably high finenesses. Table II also presents data for autoclave expansion. These data show that the resin and sand, and resin and pouzzolanic cements, exhibit materially less autoclave expansion than the control cement. It will be seen that this value may be in the order of one-half of the value obtained by the control cement. Workability tests have demonstated that cements F, G, H, I and J are markedly superior to the control and previously known cements with regard to the plastic properties produced in neat pastes and in sand mortars such as are used for plaster and stucco work.

*Table II*

| Sample | Composition | Percent | Fineness | | Grinding time | | Percent net expansion in autoclave |
|---|---|---|---|---|---|---|---|
| | | | 0/0-20 microns | Specific surface | 45 lb. 1¼" balls | 70 lb. ⅜"-½" balls | |
| A | Clinker | 96.34 | 54.8 | 1953 | Rev. 900 | Rev. 1820 | +0.490 |
| | Gypsum | 3.66 | | | | | |
| F | Clinker | 87 | 61.4 | 2005 | ...do... | ...do... | +0.276 |
| | Gypsum | 3.2 | | | | | |
| | Resin | 0.1 | | | | | |
| | Sand | 9.7 | | | | | |
| G | Clinker | 87 | 58.3 | 2059 | ...do... | ...do... | +0.288 |
| | Gypsum | 3.2 | | | | | |
| | Resin | 0.15 | | | | | |
| | Sand | 9.65 | | | | | |
| H | Clinker | 87 | 59.3 | 2216 | ...do... | ...do... | +0.240 |
| | Gypsum | 3.2 | | | | | |
| | Resin | 0.10 | | | | | |
| | Pouzzolan | 9.7 | | | | | |
| I | Clinker | 87 | 61.3 | 2238 | ...do... | ...do... | +0.274 |
| | Gypsum | 3.2 | | | | | |
| | Resin | 0.15 | | | | | |
| | Pouzzolan | 9.65 | | | | | |
| J | Clinker | 87 | 63.4 | 2236 | ...do... | ...do... | +0.260 |
| | Gypsum | 3.2 | | | | | |
| | Resin | 0.25 | | | | | |
| | Pouzzolan | 9.55 | | | | | |

While the tables show certain percentages of the resin, sand and pouzzolan to be used, these may be added in any suitable percentages productive of best results. Ordinarily the necessary amount of resin, in either type of cement will not exceed 0.50% by weight of the clinker mixture, and usually smaller percentages within the range of from 0.05% to 0.25% will suffice. The proportions of sand or pouzzolan normally will be under substantially 30% by weight of the entire clinker mixture. The tabulated finenesses also are typi-

*Table I*

| Sample | Composition | Percent | Fineness | | Grinding time | | Percent net expansion in autoclave | Percent water for N. C. | Setting time | | | | Std. 1:3 tensile strength | | | Tensile strength plaster, sand mortar | | |
|---|---|---|---|---|---|---|---|---|---|---|---|---|---|---|---|---|---|---|
| | | | 0/0-20 microns | Spec. surf. | 45 lb. 1¼" balls | 70 lb. ⅜"-½" balls | | | Initial | | Final | | | | | | | |
| | | | | | | | | | Hr. | Min. | Hr. | Min. | 1D | 7D | 28D | 1D | 3D | 7D |
| A | Control | | 54.8 | 1953 | Rev. 900 | Rev. 1820 | +0.490 | 23.5 | 2 | 46 | 5 | 15 | 153 | 391 | 441 | | | |
| B | Resin | 0.10 | 57.3 | 2009 | ...do... | ...do... | +0.570 | 26.5 | 4 | 19 | 8 | 19 | 97 | 301 | 358 | 75 | 175 | 228 |
| C | ...do... | 0.25 | 60.2 | 1982 | ...do... | ...do... | +0.608 | 27.2 | 5 | 06 | 6 | 41 | 95 | 216 | 286 | | | |
| D | ...do... | 0.50 | 57.9 | 2043 | ...do... | ...do... | +0.584 | 28.0 | 5 | 18 | 16 | 10 | 39 | 270 | 329 | | | |
| E | Commercial plastic | | 64.9 | 2545 | | | | 26.9 | 3 | 01 | 5 | 49 | | 295 | 323 | 77 | 177 | 214 | cal only, since the resin desirably effects the properties of the cement in the respects noted where the cement is ground to fineness levels below or in excess of those given.

This application is companion to our co-pending application Ser. No. 251,046, filed January 14, 1939, and in which the claims are directed to the product aspects of the invention; the claims of this case, following, being directed to the method aspects of the invention.

We claim:

1. The method of making a mixture of Portland cement and a paraffin hydrocarbon-insoluble resin produced by the extraction of pine wood by a coal tar hydrocarbon, removal of the volatile substances from such extract to produce a mixture of solid resins, the extraction of such solid mixture by a volatile paraffin hydrocarbon to remove the paraffin hydrocarbon-soluble resin, and the recovery of said paraffin hydrocarbon-insoluble resin substantially free from said paraffin hydrocarbon-soluble resin, comprising intimately admixing with Portland cement and uniformly distributing throughout the cement a small percentage of said paraffin hydrocarbon-insoluble resin.

2. The method of making a mixture of Portland cement and a paraffin hydrocarbon-insoluble resin produced by the extraction of pine wood by a coal tar hydrocarbon, removal of the volatile substances from such extract to produce a mixture of solid resins, the extraction of such solid mixture by a volatile paraffin hydrocarbon to remove the paraffin hydrocarbon-soluble resin, and the recovery of said paraffin hydrocarbon-insoluble resin substantially free from said paraffin hydrocarbon-soluble resin, comprising finely grinding Portland cement clinker containing a small percentage of said paraffin hydrocarbon-insoluble resin.

3. The method of making a mixture of Portland cement and a paraffin hydrocarbon-insoluble resin produced by the extraction of pine wood by a coal tar hydrocarbon, removal of the volatile substances from such extract to produce a mixture of solid resins, the extraction of such solid mixture by a volatile paraffin hydrocarbon to remove the paraffin hydrocarbon-soluble resin, and the recovery of said paraffin hydrocarbon-insoluble resin substantially free from said paraffin hydrocarbon-soluble resin, comprising finely grinding Portland cement clinker with substantially 0.05% to 0.50% by weight of said paraffin hydrocarbon-insoluble resin.

4. The method of making a mixture of Portland cement and a paraffin hydrocarbon-insoluble resin produced by the extraction of pine wood by a coal tar hydrocarbon, removal of the volatile substances from such extract to produce a mixture of solid resins, the extraction of such solid mixture by a volatile paraffin hydrocarbon to remove the paraffin hydrocarbon-soluble resin, and the recovery of said paraffin hydrocarbon-insoluble resin substantially free from said paraffin hydrocarbon-soluble resin, comprising finely grinding Portland cement clinker admixed with pouzzolanic shale and said paraffin hydrocarbon-insoluble resin.

5. The method of making a mixture of Portland cement and a paraffin hydrocarbon-insoluble resin produced by the extraction of pine wood by a coal tar hydrocarbon, removal of the volatile substances from such extract to produce a mixture of solid resins, the extraction of such solid mixture by a volatile paraffin hydrocarbon to remove the paraffin hydrocarbon-soluble resin, and the recovery of said paraffin hydrocarbon-insoluble resin substantially free from said paraffin hydrocarbon-soluble resin, comprising finely grinding Portland cement clinker admixed with sand and said paraffin hydrocarbon-insoluble resin.

IRA C. BECHTOLD.
HARRY E. KAISER.